United States Patent
Lewis et al.

(10) Patent No.: US 9,860,578 B2
(45) Date of Patent: Jan. 2, 2018

(54) METHODS, SYSTEMS, AND MEDIA FOR RECOMMENDING COLLABORATORS OF MEDIA CONTENT BASED ON AUTHENTICATED MEDIA CONTENT INPUT

(71) Applicant: Google Inc., Mountain View, CA (US)

(72) Inventors: Justin Lewis, Marina del Rey, CA (US); Jeffrey Lee-Chan, Venice, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/611,437

(22) Filed: Feb. 2, 2015

(65) Prior Publication Data

US 2015/0382039 A1    Dec. 31, 2015

Related U.S. Application Data

(60) Provisional application No. 62/017,140, filed on Jun. 25, 2014.

(51) Int. Cl.
  *H04N 21/2665* (2011.01)
  *H04N 21/258* (2011.01)
  (Continued)

(52) U.S. Cl.
  CPC ......... *H04N 21/2665* (2013.01); *G06Q 10/00* (2013.01); *G06Q 30/00* (2013.01);
  (Continued)

(58) Field of Classification Search
  CPC ......... H04N 21/25875; H04N 21/4622; H04N 21/47217; H04N 21/4722; H04N 21/4788;
  (Continued)

(56) References Cited

U.S. PATENT DOCUMENTS

| | | | |
|---|---|---|---|
| 8,655,718 B2 * | 2/2014 | Athsani | G06Q 30/02 705/14.51 |
| 2006/0036949 A1 * | 2/2006 | Moore | G06F 3/0482 715/730 |

(Continued)

OTHER PUBLICATIONS

International Search Report and Written Opinion of the International Searching Authority dated Sep. 23, 2015 in International Patent Application No. PCT/US2015/037509.

*Primary Examiner* — Nathan Flynn
*Assistant Examiner* — Cynthia Fogg
(74) *Attorney, Agent, or Firm* — Byrne Poh LLP

(57) ABSTRACT

Methods, systems, and media for recommending collaborators of media content based on authenticated media content input are provided. In some implementations, the method comprises: receiving a request from a content creator to initiate presentation of broadcasted media content using a media device, wherein the request invites a plurality of users to participate in the broadcasted media content; determining that a user of the plurality of users has interacted with the broadcasted media content, wherein the user has been permitted to interact with the broadcasted media content in response to providing user authentication information; determining collaborator information associated with the user based on the user authentication information; and automatically causing, without user interaction, the determined collaborator information to be presented to the content creator for associating with the broadcasted media content.

21 Claims, 6 Drawing Sheets

(51) Int. Cl.
  *H04N 21/2743* (2011.01)
  *H04N 21/472* (2011.01)
  *H04N 21/475* (2011.01)
  *H04N 21/4784* (2011.01)
  *H04N 21/4788* (2011.01)
  *H04N 21/8545* (2011.01)
  *G06Q 10/00* (2012.01)
  *G06Q 30/00* (2012.01)
  *H04W 4/06* (2009.01)
  *H04W 4/20* (2009.01)

(52) U.S. Cl.
  CPC ... *H04N 21/25875* (2013.01); *H04N 21/2743* (2013.01); *H04N 21/4753* (2013.01); *H04N 21/4784* (2013.01); *H04N 21/4788* (2013.01); *H04N 21/47205* (2013.01); *H04N 21/8545* (2013.01); *H04W 4/06* (2013.01); *H04W 4/206* (2013.01)

(58) Field of Classification Search
  CPC .......... H04N 5/44543; H04N 21/2665; H04N 21/2743; H04N 21/47205; H04N 21/4753; H04N 21/4784; H04N 21/8545; G06Q 10/00; G06Q 30/00; H04W 4/06
  USPC .......................................... 725/28
  See application file for complete search history.

(56) References Cited

U.S. PATENT DOCUMENTS

| | | | | |
|---|---|---|---|---|
| 2006/0170760 A1* | 8/2006 | Anderson, Jr. | .... | H04N 7/17318 348/14.04 |
| 2006/0239648 A1* | 10/2006 | Varghese | .......... | G06F 17/30038 386/243 |
| 2007/0250901 A1* | 10/2007 | McIntire | ............ | H04N 7/17318 725/146 |
| 2007/0282680 A1* | 12/2007 | Davis | .................... | G06Q 30/00 705/14.69 |
| 2008/0155588 A1* | 6/2008 | Roberts | .................. | G06Q 30/00 725/34 |
| 2008/0168506 A1* | 7/2008 | Pickelsimer | ........... | G06Q 10/10 725/61 |
| 2009/0164904 A1* | 6/2009 | Horowitz | .......... | G06F 17/30817 715/723 |
| 2009/0187825 A1* | 7/2009 | Sandquist | ......... | G06F 17/30781 715/719 |
| 2009/0300475 A1* | 12/2009 | Fink | .................... | G06F 17/3082 715/230 |
| 2011/0026898 A1* | 2/2011 | Lussier | ................ | G11B 27/034 386/280 |
| 2011/0246555 A1 | 10/2011 | Hedges | | |
| 2012/0265755 A1* | 10/2012 | McNally | ............. | G06Q 10/063 707/723 |
| 2012/0278825 A1 | 11/2012 | Tran et al. | | |
| 2012/0321281 A1* | 12/2012 | Hilem | .................. | H04N 9/8233 386/241 |
| 2014/0140675 A1* | 5/2014 | de Sa | ............... | H04N 21/21805 386/223 |
| 2014/0186004 A1* | 7/2014 | Hamer | ................ | G11B 27/034 386/223 |
| 2015/0043892 A1* | 2/2015 | Groman | ............... | G11B 27/034 386/278 |
| 2015/0347561 A1* | 12/2015 | Voss | .................... | G06Q 10/101 707/738 |

* cited by examiner

METHODS, SYSTEMS, AND MEDIA FOR RECOMMENDING COLLABORATORS OF MEDIA CONTENT BASED ON AUTHENTICATED MEDIA CONTENT INPUT

CROSS-REFERENCE TO RELATED APPLICATIONS

The application claims the benefit of U.S. Provisional Patent Application No. 62/017,140, filed Jun. 25, 2014, which is hereby incorporated by reference herein in its entirety.

TECHNICAL FIELD

The disclosed subject matter relates to methods, systems, and media for recommending collaborators of media content based on authenticated media content input. More particularly, the disclosed subject matter relates to automatically obtaining collaborator information and/or revenue sharing information for a content creator of video content based on user authentication data.

BACKGROUND

When an event takes place, many users may capture the event using a camera device, such as a mobile device that includes a camera for capturing videos. This can include, for example, the playing of a video game with multiple participants where each participant has a camera device or a live stream of a meeting concerning a particular topic. These users may also upload the resulting video to a video sharing and/or video hosting service, where the video can be shared and watched by others.

When uploading video content to a video sharing and/or video hosting service, content creators have no effective approaches to list collaborators involved in the video content. As a result, the majority of video content uploaded to video hosting services is left without collaborator annotations or video credits.

Accordingly, it is desirable to provide new mechanisms for recommending collaborators of media content.

SUMMARY

Methods, systems, and media for recommending collaborators of media content based on authenticated media content input are provided. In accordance with some embodiments of the disclosed subject matter, a method for determining collaborators associated with media content is provided, the method comprising: receiving a request from a content creator to initiate presentation of broadcasted media content using an imaging device, wherein the request invites a plurality of users to participate in the broadcasted media content; determining that a user of the plurality of users has interacted with the broadcasted media content, wherein the user has been permitted to interact with the broadcasted media content in response to providing user authentication information; determining collaborator information associated with the user based on the user authentication information; and automatically causing, without user interaction, the determined collaborator information to be presented to the content creator for associating with the broadcasted media content.

In some embodiments, the user of the plurality of users interacts with the broadcasted media content using their respective imaging device. In some embodiments, the user of the plurality of users interacts with the broadcasted media content by inserting a clip of media content into the broadcasted media content. In some embodiments, the user of the plurality of users interacts with the broadcasted media content by editing at least a portion of the broadcasted media content using an editing tool.

In some embodiments, the method further comprises automatically causing, without user interaction, contributor metadata associated with the broadcasted media content to include the collaborator information.

In some embodiments, the method further comprises receiving an indication from the content creator to associate that the collaborator information with the broadcasted media content. In some embodiments, the method further comprises generating a list of credits that includes the collaborator information. In some embodiments, the method further comprises annotating the broadcasted media content with the collaborator information. In some embodiments, the method further comprises inserting the collaborator information into collaborator metadata associated with a portion of the broadcasted media content that the user has interacted.

In some embodiments, the collaborator information includes a role of the user that has interacted with the broadcasted media content. In some embodiments, the method further comprises determining revenue share information based at least in part on the interaction with the broadcasted media content and the role of the user.

In some embodiments, the collaborator information includes an editing tool used by the user to interact with the broadcasted media content. In some embodiments, the method further comprises determining the role of the user based on the editing tool. In some embodiments, the method further comprises determining the revenue sharing information based at least in part on the editing tool used by the user to interact with the broadcasted media content.

In some embodiments, the method further comprises identifying the user that has interacted with the broadcasted media content, wherein the interaction includes using a respective imaging device to provide user-generated media content. In some embodiments, the method further comprises: determining a channel associated with the identified user; and associating a link to the channel with the user-generated media content within the broadcasted media content.

In some embodiments, the method further comprises transmitting a message to the user verifying that the user interacted with the broadcasted media content. In some embodiment, the message includes the determined revenue sharing information. In some embodiments, the message is transmitted in response to determining that the user has provided user authentication information on a video providing service, the user is viewing the broadcasted media content on the video providing service, the user interacted with the broadcasted media content, and the user did not upload the broadcasted media content to the video providing service.

In accordance with some embodiments of the disclosed subject matter, a system for determining collaborators associated with media content is provided, the system comprising: a hardware processor that is configured to: receive a request from a content creator to initiate presentation of broadcasted media content using an imaging device, wherein the request invites a plurality of users to participate in the broadcasted media content; determine that a user of the plurality of users has interacted with the broadcasted media content, wherein the user has been permitted to interact with the broadcasted media content in response to providing user authentication information; determine collaborator information associated with the user based on the user authentication information; and automatically cause, without user interaction, the determined collaborator information to be presented to the content creator for associating with the broadcasted media content.

In accordance with some embodiments of the disclosed subject matter, a non-transitory computer-readable medium containing computer-executable instructions that, when executed by a processor, cause the processor to perform a method for determining collaborators associated with media content is provided, the method comprising: receiving a request from a content creator to initiate presentation of broadcasted media content using an imaging device, wherein the request invites a plurality of users to participate in the broadcasted media content; determining that a user of the plurality of users has interacted with the broadcasted media content, wherein the user has been permitted to interact with the broadcasted media content in response to providing user authentication information; determining collaborator information associated with the user based on the user authentication information; and automatically causing, without user interaction, the determined collaborator information to be presented to the content creator for associating with the broadcasted media content.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify the like elements.

DETAILED DESCRIPTION

In some embodiments, mechanisms (which can include methods, systems, and media) for recommending collaborators of media content based on authenticated media content input are provided.

In some embodiments, as media content is being captured, broadcasted, and received at a video sharing and/or video hosting service, these mechanisms can, using user authentication information, determine collaborators that have interacted with the media content and their associated collaborator information and present the collaborator information to the content creator.

For example, the mechanisms can receive a request to initiate a session that broadcasts media content using an imaging device. Such as session can include a live video feed captured by an imaging device of a mobile device, a wearable computing device, or any other suitable device having a camera. In this example, the mechanisms can determine that a user has interacted with the media content by participating in the session using a device having a camera, by editing the media content using an editing tool, and/or by inserting other media content into the broadcasted media content. It should be noted that the user has provided user authentication information (e.g., a user account, a username, etc.) associated with a request for interacting with the broadcasted media content. In response to such a determination, the mechanisms can determine collaborator information based on the user authentication information. The determined collaborator information can then be used to, for example, automatically annotate the contributor metadata associated with the broadcasted media content, present a list of recommended collaborators to the content creator for association with the broadcasted media content, automatically generate an annotation or collaborator metadata in response to a particular interaction with the broadcasted media content, determine revenue sharing information, and/or transmit a message to a potential collaborator relating to the interaction with the broadcasted media content.

In some embodiments, the collaborator information can include, the user account, the role corresponding to the interaction with the broadcasted media content, revenue sharing information, tools used to interact with the broadcasted media content, etc.

Figure 1:
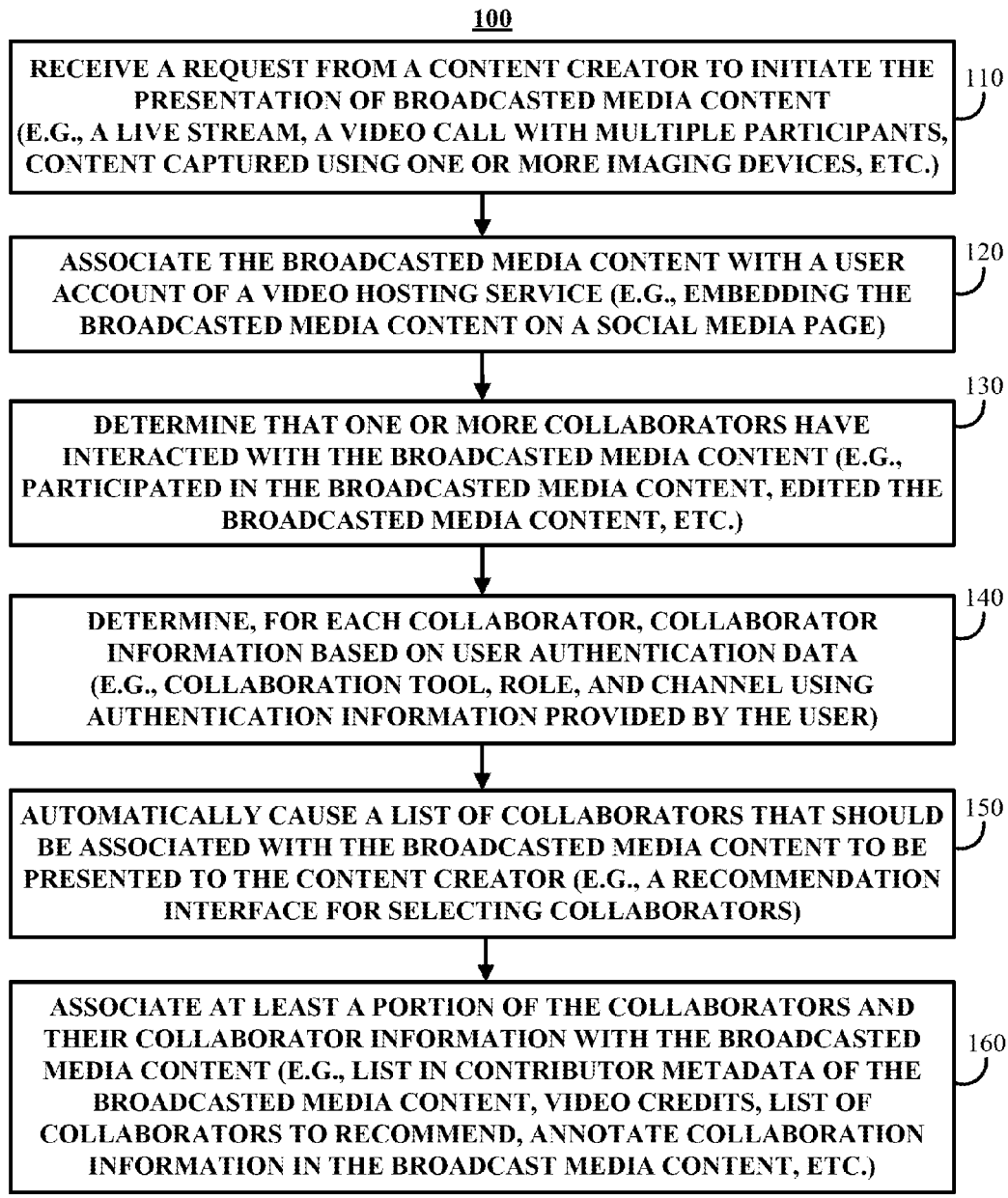
FIG. 1 shows an illustrative example of a process for automatically determining collaborators of broadcasted media content based on user authentication information in accordance with some embodiments of the disclosed subject matter.

Turning to FIG. 1, an illustrative example of a process 100 for automatically determining collaborators of broadcasted media content based on user authentication information is shown in accordance with some embodiments of the disclosed subject matter. As shown, process 100 can begin, at 110, by receiving a request from a content creator to initiate the presentation of broadcasted media content. This can include, for example, a request to initiate a live stream of video data (e.g., video data that is being transmitted contemporaneously with the video being captured), recorded video data (e.g., video data that is not transmitted contemporaneously with the video being captured), or any suitable combination thereof. In a more particular example, the request from the content creator to initiate a broadcasted session can include a name of the session, a description of the session, a starting time for the session, audience and/or participation information (e.g., the session is publicly available, the session is limited to particular users or particular groups of users, etc.), etc. In this example, the content creator may invite multiple users or particular groups of users without knowing which of the invited users participated or otherwise interacted with the broadcasted media content.

In some embodiments, the session of broadcasted media content can be associated with a user account corresponding to the content creator at 120. For example, as the media content is being captured, broadcasted, and/or received by the video sharing and/or video hosting service, the media content can be presented on a video channel corresponding to the user account. In this example, a viewer that is visiting the video channel or page of the video sharing and/or video hosting service can view the broadcasted media content.

At 130, process 100 can determine that one or more collaborators have interacted with the broadcasted media content. For example, as described above, a user that received an invitation based on the request to initiate the session can participate in the broadcasted media content using a camera device or any other suitable media content input device. In a more particular example, a user having a webcam can join the session and the content stream captured by the webcam can be included in the media content being broadcast by the content creator. In another example, a user can interact with the broadcasted media content using one or more editing tools. In a more particular example, a user using an editing tool can insert or splice a video clip, an image, an audio clip, and/or any other suitable media into the broadcasted media content. In yet another example, a user can interact with the broadcasted media content by overlaying music or video clips into the recorded media content.

At 140, process 100 can determine, for each collaborator, collaborator information based on the user authentication information. For example, based on authenticated media content input from multiple collaborators to the broadcasted media content, collaboration information can be determined for each of the collaborators.

It should be noted that, in order to participate or otherwise interact with the broadcasted media content, the collaborator can be prompted to provide user authentication information. For example, in response to visiting the video sharing and/or video hosting service and requesting to participate in the media content, the collaborator can be prompted to provide a user account or any other suitable user authentication information. In another example, in response to using an editing tool to insert or splice media into the broadcasted media content, the collaborator can be prompted to provide a user account or any other suitable user authentication information.

It should also be noted that user authentication information can include any suitable authentication information, such as user account information, a user name, a password, an authentication code, identification information, etc. For example, process 100 can query the user for permission to connect to the video sharing and/or video hosting service with which the user is associated. In another example, process 100 can request that the user connect to the video sharing and/or video hosting service with which the user is associated. In yet another example, process 100 can request that the user connect to the editing tool with which the user is associated and the editing tool can pass the user authentication information to the video sharing and/or video hosting service.

In some embodiments, collaborator information that can be determined from the user authentication information can include, for example, a user identifier or identification information, a video channel on a video sharing and/or video hosting service that is associated with the user, a role associated with the user (e.g., collaborator, director, producer, editor, guest star, etc.), an editing tool or application used by the user to edit the broadcasted media content, etc.

It should be noted that, in some embodiments, upon determining a video channel associated with a collaborating user, process 100 can activate enhanced features with the inserted media content associated with the user. For example, upon determining that a user having an associated video channel participates in the broadcasted media content using a suitable imaging device, the portion of the broadcasted media content associated with the user (e.g., a live stream of video data) can be enhanced with a video annotation. In this example, in response to a viewer consuming the broadcasted media content on the video sharing and/or video hosting service and providing a particular user input (e.g., using a pointer to select that portion of the broadcasted media content), the video annotation can direct the viewer to the video channel associated with the collaborating user.

Figure 2:
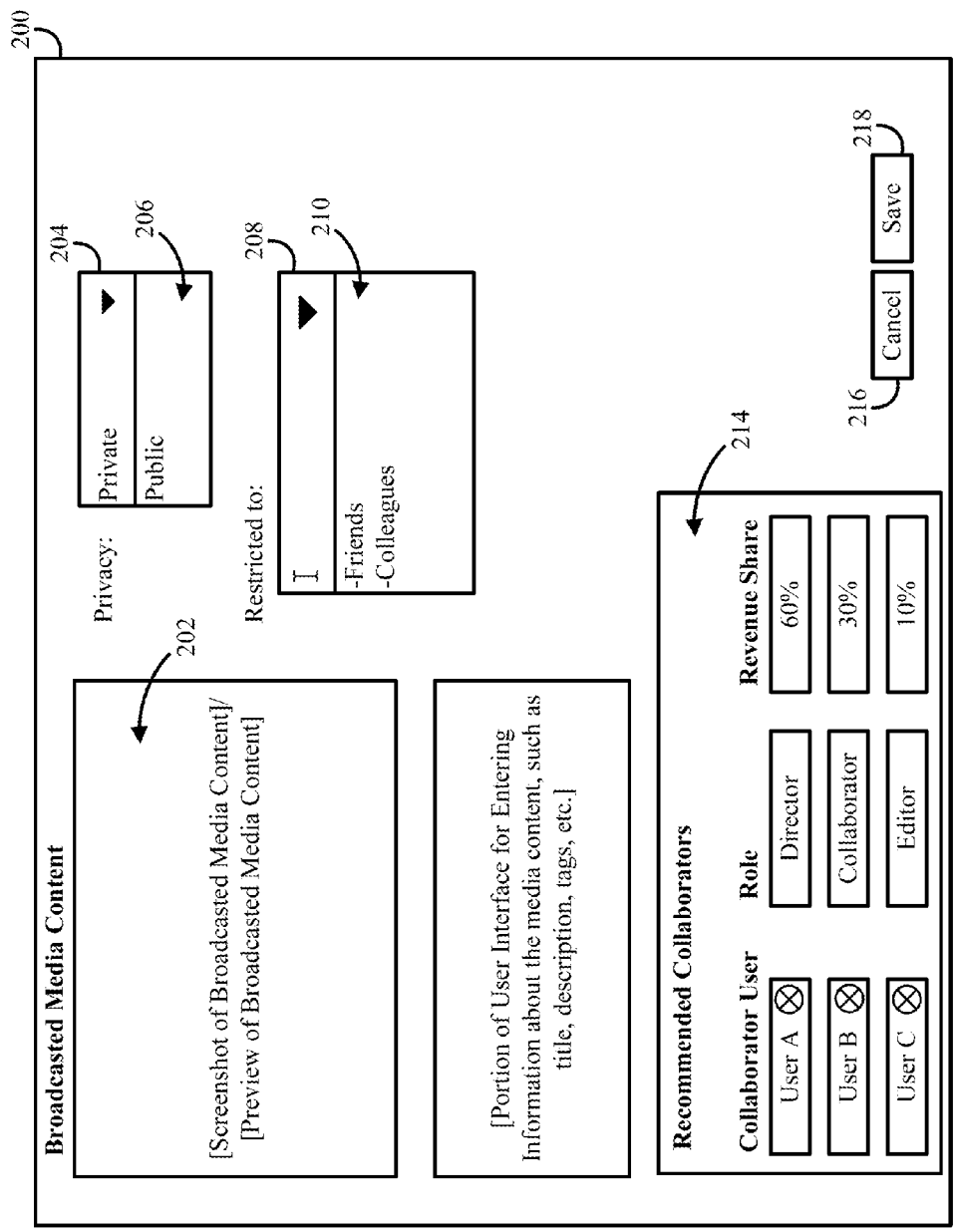
FIG. 2 shows an illustrative example of a user interface that recommends collaborators of broadcasted media content based on user authentication information in accordance with some embodiments of the disclosed subject matter.

In some embodiments, at 150, the collaborator information can be used to automatically cause a list of collaborators that should be associated with the broadcasted media content to be presented to the content creator. For example, as shown in FIG. 2, a recommended collaborators section 214 in a user interface 200 can be provided to the content creator upon uploading the broadcasted media content (e.g., a recorded live stream of video data) to the video sharing and/or hosting service. More particularly, the recommended collaborators section can identify the collaborating users that participated and/or interacted with the broadcasted media content, the roles of each collaborating user (e.g., director, editor, guest star, etc.), and the revenue share allocated to each collaborating user. In response to being provided with user interface 200 that includes recommended collaborators section 214, the content creator can determine which of the recommended collaborator users should be associated with the broadcasted media content.

In some embodiments, as also shown in FIG. 2, collaborator information can include revenue share information, where revenue share information can be determined based on any suitable criterion. For example, revenue share information can be based on role, the amount that the user participated and/or interacted with the broadcasted media content, etc.

At 160, process 100 can associate at least a portion of the collaborators and their collaborator information with the broadcasted media content.

Additionally or alternatively, the users that participated and/or otherwise interacted with the broadcasted media content can be automatically listed in the contributor metadata associated with the broadcasted media content. For example, in response to a user using an editing tool to modify a portion of the broadcasted media content (e.g., by inserting a musical score as an introduction into the broadcasted media content), the user and the collaborator information associated with the user can be automatically inserted into the contributor metadata as an editor of the broadcasted media content. In another example, in response to a user using an editing tool to modify a portion of the broadcasted media content (e.g., by inserting a musical score as an introduction into the broadcasted media content), the user and the collaborator information associated with the user can be automatically inserted into the contributor metadata associated with that interacted portion of the broadcasted media content.

It should be noted that, in some embodiments, collaborator information associated with media inserted into the broadcasted media content can be listed in the contributor metadata associated with the broadcasted media content. For example, in response to a user using an editing tool to modify a portion of the broadcasted media content (e.g., by inserting a musical score as an introduction into the broadcasted media content), process 100 can determine the collaborator information associated with the inserted musical score and automatically insert the collaborator information into the contributor metadata of the broadcasted media content. In another example, the collaborator information can be populated into a recommendation, such as the user interface shown in FIG. 2, where the content creator can determine whether to include such collaborator information with the media content.

FIG. 2 shows an illustrative example of a user interface 200 for presenting a content creator with recommended collaborators of the broadcasted media content based on user authentication information in accordance with some embodiments of the disclosed subject matter. As shown in FIG. 2, in some embodiments, user interface 200 can include video identifying information 202 of a video for uploading to a video sharing and/or hosting service. Video identifying information 202 can include any suitable identifying information that identifies one or more videos (e.g., a title of a live stream of video data, a topic associated with recorded video data, etc.).

In some embodiments, user interface 200 can include a privacy setting element 204 that can be used to select a privacy setting to apply to the broadcasted media content identified by video identifying information 204. Any suitable technique or combination of techniques can be used to receive a selection from a user of a privacy setting to be selected using privacy setting element 204. For example, as shown in FIG. 2, privacy setting element 204 can include a drop down list 206 which can include privacy settings which a user can select to assign to the broadcasted media content identified by video identifying information 202. In a more particular example, privacy settings can include public, private, and/or any other suitable settings.

In some embodiments, user interface 200 can include a restriction input element 208, which can be used to receive criteria to be used in restricting access to the broadcasted media content. Any suitable criteria can be selected using restriction input element 208. For example, one or more users can be identified as users that are to be granted access to the broadcasted media content. The users can be other users of a service for hosting content (e.g., the one or more videos identified by video identifying information 202). The users can also be users of a particular social network associated with the service for hosting content. In some embodiments, the users can be specified using identifying information, such as an email address, a username, a video channel on the video sharing and/or hosting service, a phone number, and/or any other suitable identifying information. Additionally or alternatively, the users can be specified by membership in a group, such as users connected to the user associated with the one or more videos identified in video identifying information 202, and/or any other suitable group of users or potential users. These groups can be defined using any suitable technique or techniques. Any other suitable criteria can also be selected, such as by restricting access to users that have installed a particular application (e.g., on a device being used to access the content, in association with a particular user account associated with the user such as an application accessed through a social media account, etc.). Any suitable technique or techniques can be used to input criteria to be used in restricting access to the content. For example, the criteria can be selected from a drop down list 210, the criteria can be specified using an input such as text, images, audio, video, and/or any other suitable input specifying the criteria.

As described above, user interface 200 can include a recommended collaborators section 214. For example, recommended collaborators section 214 can identify the collaborating users that participated and/or interacted with the broadcasted media content, the roles of each collaborating user (e.g., director, editor, guest star, etc.), and the revenue share allocated to each collaborating user. In response to being provided with user interface 200 that includes recommended collaborators section 214, the content creator can determine which of the recommended collaborator users should be associated with the broadcasted media content.

In some embodiments, user interface 200 can include a cancel element 216 and a save element 218 for cancelling or saving the currently selected collaborator information (among any other suitable settings associated with the video, such as a description, metadata, categories, etc.).

Figure 3:
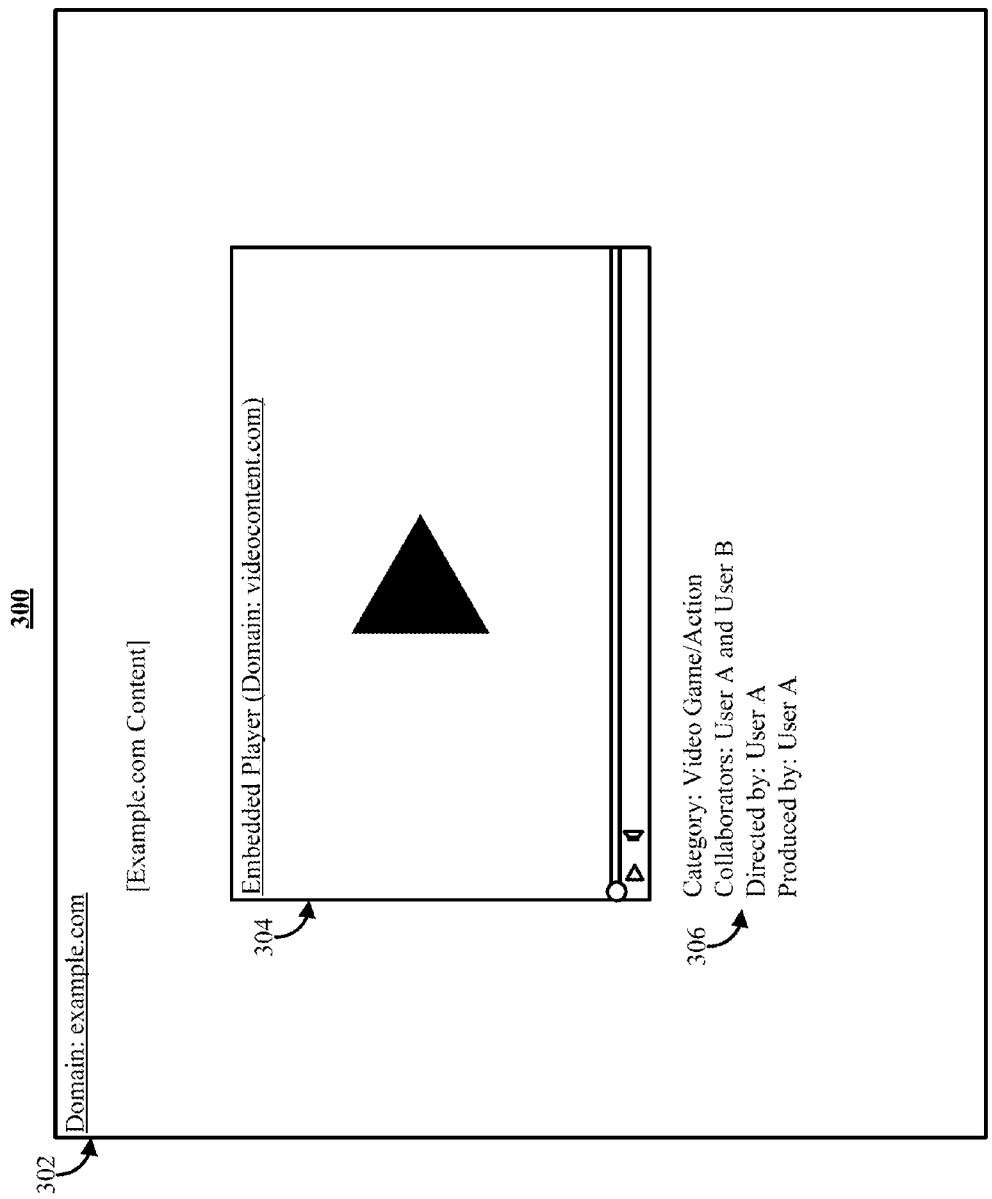
FIG. 3 shows an illustrative example of an embedded player that provides the broadcasted media content along with an automatically generated list of collaborator information in accordance with some embodiments of the disclosed subject matter.

In some embodiments, an automatically generated list of collaborator information can be presented to viewers consuming the broadcasted media content. For example, FIG. 3 shows an illustrative example of an embedded player that plays back the broadcasted media content along with an automatically generated list of collaborator information in the form of video credits. As shown in FIG. 3, user interface 300 can include a portion of a web page 302 of a first domain (e.g., example.com) and an embedded video player 304 for presenting broadcasted media content associated with a hosting domain (e.g., videocontent.com). Using user authentication information, user A and user B have been added as collaborators to video credits 306 that are presented along with the broadcasted media content loaded in an embedded video player 304.

Figure 4:
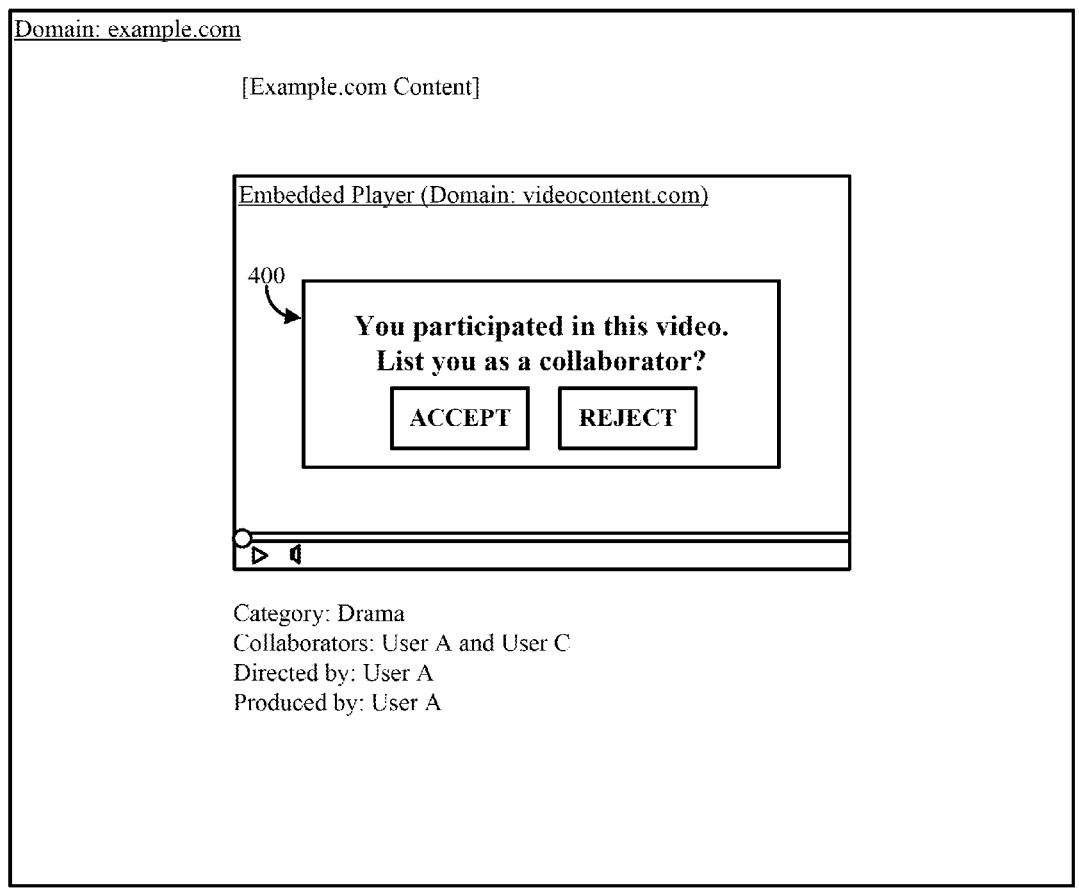
FIG. 4 shows an illustrative example of a verification message provided to a collaborator that is viewing the broadcasted media content in accordance with some embodiments of the disclosed subject matter.

In some embodiments, a message to a collaborating user verifying that the user interacted with the broadcasted media content can be presented. For example, as shown in FIG. 4, in response to determining that the user has provided user authentication information on a video providing service (e.g., a user account), the user is viewing the broadcasted media content on the video providing service in which the user did not upload the media content to the video providing service, and the user participated and/or interacted with the broadcasted media content, a user interface 400 that includes a verification message can be presented to the user. In this example, a response to the verification message from the user indicating that the user contributed to the media content as a collaborator can cause the collaborator information associated with the user to be automatically added to the contributor metadata of the media content.

Figure 5:
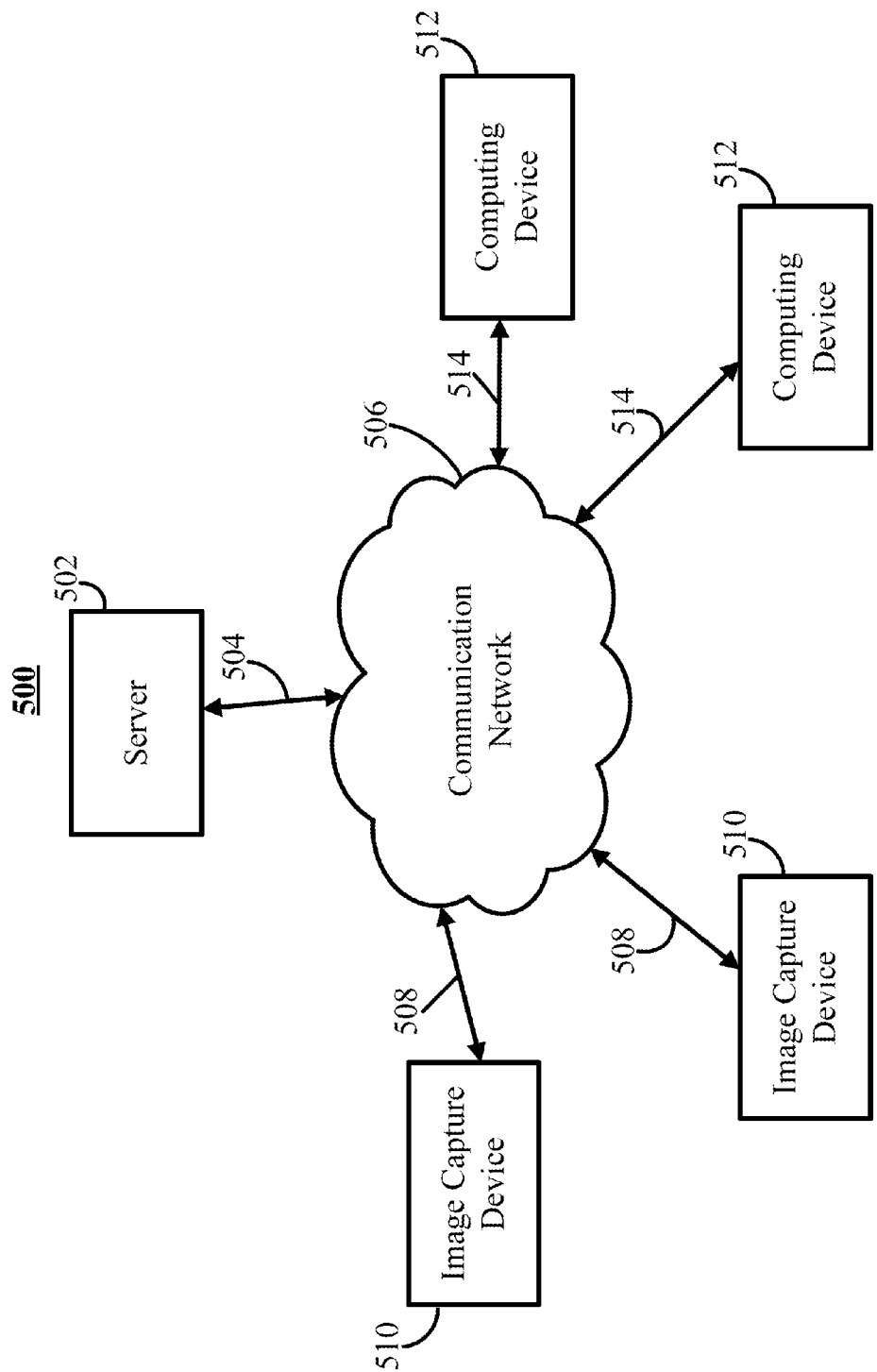
FIG. 5 shows a generalized schematic diagram of an illustrative system for automatically determining collaborators of broadcasted media content based on user authentication information in accordance with some embodiments of the disclosed subject matter.

FIG. 5 shows an example 500 of a generalized schematic diagram of a system on which the mechanisms for presenting annotations across multiple videos as described herein can be implemented in accordance with some embodiments. As illustrated, system 500 can include one or more image capture devices 510. Image capture devices 510 can be local to each other or remote from each other. Image capture devices 510 can be connected by one or more communications links 508 to a communications network 506 that can be linked via a communications link 504 to server 502 and/or computing devices 512. System 500 can further include one or more computing devices 512. Computing devices 512 can be local to each other or remote from each other. Computing devices 512 can be connected by one or more communications links 514 to communications network 506 that can be linked via communications link 504 to server 502.

System 500 can include one or more servers 502. Server 502 can be any suitable server for providing access to the mechanisms described herein for aggregating and presenting multiple videos of an event, such as a processor, a computer, a data processing device, or any suitable combination of such devices. For example, the mechanisms for aggregating and presenting multiple videos of an event can be distributed into multiple backend components and multiple frontend components and/or interfaces. In a more particular example, backend components, such as data collection, data distribution and video aggregating can be performed on one or more servers 502. In another particular example, frontend components, such as video capture, a user interface, data entry, video presentation, etc., can be performed on one or more image capture devices 510 and/or one or more computing devices 512.

In some embodiments, each of the image capture devices 510, computing devices 512 and server 502 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, image capture device 510 can be implemented as a smartphone having a camera, a tablet computer having a camera, a wearable computer having a camera, a camera device that interfaces with a smartphone (e.g., a camera dongle for a smartphone), a digital camera (e.g., a point and shoot camera, a DSLR camera, a digital camcorder, etc.), an analog camcorder, any other image capture device for capturing video, or any suitable combination thereof. As another example, computing device 512 can be implemented as a personal computer, a laptop computer, a smartphone, a tablet computer, a gaming device, a digital media receiver, a set-top box, a smart television, a server, etc.

Communications network 506 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 504, 508 and 514 can be any communications links suitable for communicating data among image capture devices 510, computing devices 512, and server 502, such as network links, dial-up links, wireless links, hard-wired links, any other suitable communications links, or any suitable combination of such links. Image capture devices 510 can capture video of an event that can be uploaded to server 502 (either by image capture device 510 and/or computing device 512). Image capture device 510 can also be used to present videos from server 502 to a viewer (e.g., using an application for rendering videos). Computing devices 512 can be used to upload video captured by an image capture device 510 to server 502 running the aggregation application and/or present videos from server 502 to a viewer (e.g., using an application for rendering videos). Image capture devices 510, computing devices 512, and server 502 can be located at any suitable location.

Figure 6:
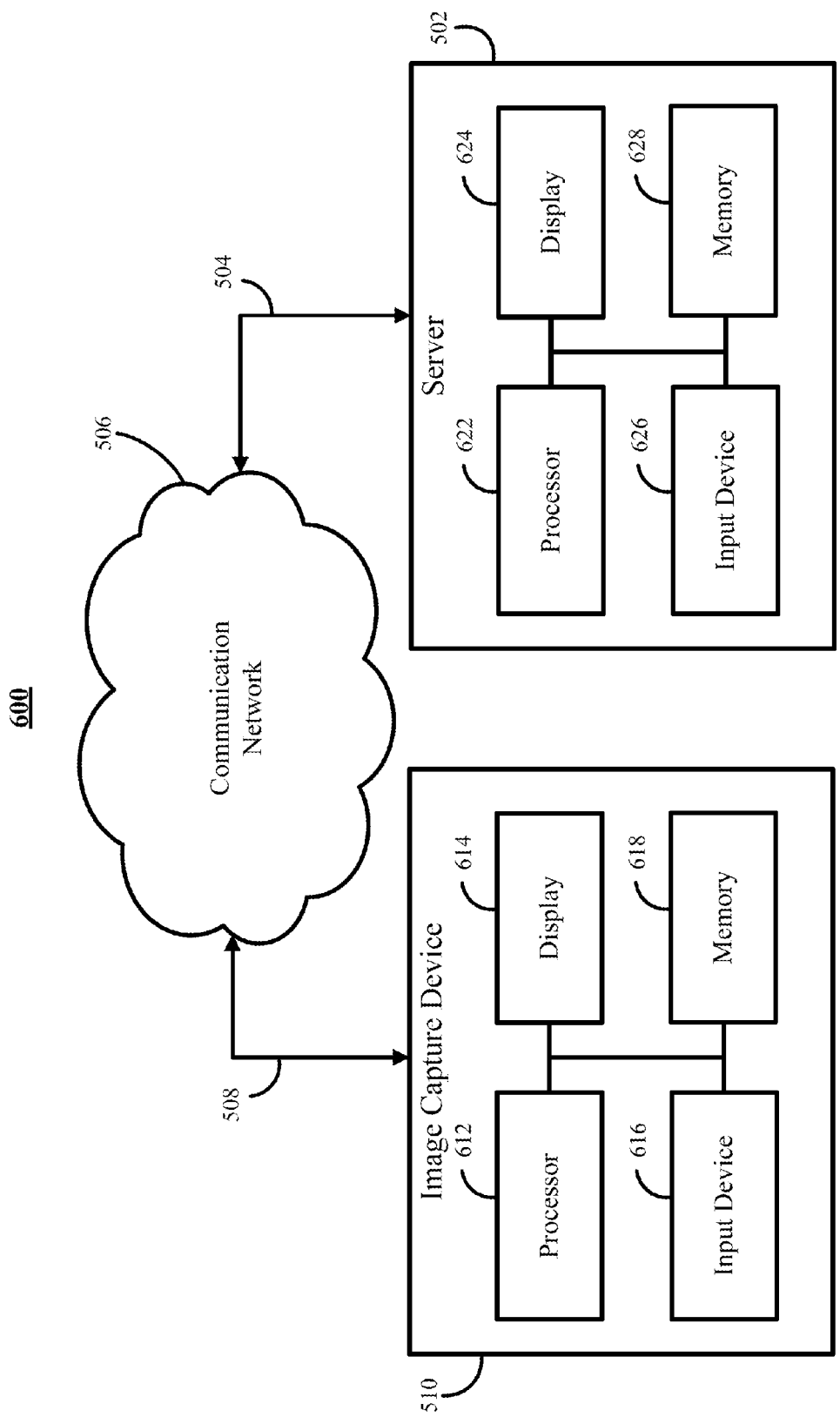
FIG. 6 shows a detailed example of a server and one of the computing devices of FIG. 5 that can be used in accordance with some embodiments of the disclosed subject matter.

FIG. 6 illustrates an example 600 of hardware that can be used to implement server 502 and one of image capture devices 510 depicted in FIG. 5 in accordance with some embodiments of the disclosed subject matter. Referring to FIG. 6, image capture device 510 can include a hardware processor 612, a display 614, an input device 616, and memory 618, which can be interconnected. In some embodiments, memory 618 can include a storage device (such as a non-transitive computer-readable medium) for storing a computer program for controlling hardware processor 612.

Hardware processor 612 can use the computer program to present on display 614 content and/or an interface that allows a user to, among other things, capture video, enter title and/or description information, cause a video to be uploaded to server 502, interact with the mechanisms described herein for aggregating and presenting multiple videos of an event being executed by a device, such as server 502, and to send and receive data through communications link 508. It should also be noted that data received through communications link 508 or any other communications links can be received from any suitable source. In some embodiments, hardware processor 612 can send and receive data through communications link 508 or any other communication links using, for example, a transmitter, receiver, transmitter/receiver, transceiver, or any other suitable communication device. Input device 616 can be a lens, an image sensor, a computer keyboard, a computer mouse, a microphone, a touchpad, a voice recognition circuit, a touchscreen, and/or any other suitable input device.

Server 502 can include a hardware processor 622, a display 624, an input device 626, and memory 628, which can be interconnected. In some embodiments, memory 628 can include a storage device for storing data received through communications link 504 or through other links. The storage device can further include a server program for controlling hardware processor 622.

Hardware processor 622 can use the server program to communicate with image capture devices 510 and computing devices 512, as well as provide access to and/or copies of the aggregation application. It should also be noted that data received through communications link 504 or any other communications links can be received from any suitable source. In some embodiments, hardware processor 622 can send and receive data through communications link 504 or any other communication links using, for example, a transmitter, receiver, transmitter/receiver, transceiver, or any other suitable communication device. In some embodiments, hardware processor 622 can receive commands and/or values transmitted by one or more users. Input device 626 can be a computer keyboard, a computer mouse, a touchpad, a voice recognition circuit, a touchscreen, a lens, an image sensor, and/or any other suitable input device.

In some embodiments, server 502 can be implemented in one server or can be distributed as any suitable number of servers. For example, multiple servers 502 can be implemented in various locations to increase reliability and/or increase the speed at which the server can communicate with client devices 502. As another example, multiple servers 502 can be implemented for performing various tasks, such as one server (or set of servers) can receive videos (e.g., video data and video metadata), another server (or set of servers) can execute the aggregation application for determining whether received videos depicting the same event, and yet another server can present videos to viewers in response to a request to present a video.

It should be noted that computing device 512 can be implemented similarly to image capture device 510 and/or server 502, and can include a hardware processor, a display, an input device, and memory.

In one particular embodiment, the aggregation application can include server-side software, server-side hardware, client-side software, client-side hardware, or any suitable combination thereof. For example, the aggregation application can encompass a computer program written in a programming language recognizable by server 502 executing the aggregation application (e.g., a program written in a programming language, such as, Java, C, Objective-C, C++, C#, Javascript, Visual Basic, ColdFusion, or any other suitable approaches).

Accordingly, methods, systems, and media for recommending collaborators of media content based on authenticated media content input are provided.

In some embodiments, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the process of FIG. 1 can be executed or performed in any order or sequence not limited to the order and sequence shown and described in the figures. Also, some of the above steps of the process of FIG. 1 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for determining collaborators associated with media content, the method comprising:
   receiving a request from a content creator to initiate a session that broadcasts media content, wherein the request invites a plurality of users to participate in the session, and wherein the broadcasted media content is captured during the session using at least a media device of the content creator and a media device of at least one of the plurality of users;
   determining, using a hardware processor, that a user of the plurality of users has modified at least a portion of the broadcasted media content using an editing tool, wherein the user has been permitted to modify the broadcasted media content in response to determining that the user is one of the plurality of users invited in the received request and wherein user authentication information corresponding to the user has been received from the editing tool;
   determining collaborator information associated with the modified portion of the broadcasted media content for the user based on the user authentication information received from the editing tool, wherein the collaborator information includes user information corresponding to the user authentication information and role information corresponding to a type of modification made using the editing tool;
   in response to detecting that the broadcast media content is being uploaded to a video providing service, automatically causing, without user interaction, the determined collaborator information to be presented to the content creator in a recommendation interface for selecting one or more collaborators from the collaborator information to associate with the broadcasted media content prior to the broadcasted media content being shared on the video providing service; and
   annotating the broadcast media content with collaborator metadata that includes the selected one or more collaborators from the recommendation interface, wherein the collaborator metadata is presented during playback of the broadcasted media content on the video providing service.

2. The method of claim 1, wherein the user of the plurality of users interacts with the broadcasted media content using their respective media device.

3. The method of claim 1, wherein the user of the plurality of users interacts with the broadcasted media content by inserting a clip of media content into the broadcasted media content.

4. The method of claim 1, further comprising automatically causing, without user interaction, contributor metadata associated with the broadcasted media content to include the collaborator information.

5. The method of claim 1, further comprising receiving an indication from the content creator to associate the collaborator information with the broadcasted media content.

6. The method of claim 1, further comprising inserting the collaborator information into collaborator metadata associated with a portion of the broadcasted media content with which the user has interacted.

7. The method of claim 1, wherein the collaborator information includes a role of the user that has interacted with the broadcasted media content and wherein the method further comprises determining revenue share information based at least in part on the interaction with the broadcasted media content and the role of the user.

8. The method of claim 7, wherein the collaborator information includes the editing tool used by the user to interact with the broadcasted media content and wherein the method further comprises:
   determining the role of the user based on the editing tool; and
   determining the revenue sharing information based at least in part on the editing tool used by the user to interact with the broadcasted media content.

9. The method of claim 1, further comprising:
   identifying the user that has interacted with the broadcasted media content, wherein the interaction includes using a respective media device to provide user-generated media content;
   determining a channel associated with the identified user; and
   associating a link to the channel with the user-generated media content within the broadcasted media content.

10. The method of claim 1, further comprising transmitting a message to the user verifying that the user interacted with the broadcasted media content, wherein the message includes the determined revenue sharing information and wherein the message is transmitted in response to determining that the user has provided user authentication information on a video providing service, the user is viewing the broadcasted media content on the video providing service, the user interacted with the broadcasted media content, and the user did not upload the broadcasted media content to the video providing service.

11. A system for determining collaborators associated with media content, the method comprising:
a hardware processor that is configured to:
receive a request from a content creator to initiate a session that broadcasts media content using a media device, wherein the request invites a plurality of users to participate in the session, and wherein the broadcasted media content is captured during the session using at least a media device of the content creator and a media device of at least one of the plurality of users;
determine that a user of the plurality of users has modified at least a portion of the broadcasted media content using an editing tool, wherein the user has been permitted to modify the broadcasted media content in response to determining that the user is one of the plurality of users invited in the received request and wherein user authentication information corresponding to the user has been received from the editing tool;
determine collaborator information associated with the modified portion of the broadcasted media content for the user based on the user authentication information received from the editing tool, wherein the collaborator information includes user information corresponding to the user authentication information and role information corresponding to a type of modification made using the editing tool;
in response to detecting that the broadcast media content is being uploaded to a video providing service, automatically cause, without user interaction, the determined collaborator information to be presented to the content creator in a recommendation interface for selecting one or more collaborators from the collaborator information to associate with the broadcasted media content prior to the broadcasted media content being shared on the video providing service; and
annotate the broadcast media content with collaborator metadata that includes the selected one or more collaborators from the recommendation interface, wherein the collaborator metadata is presented during playback of the broadcasted media content on the video providing service.

12. The system of claim 11, wherein the user of the plurality of users interacts with the broadcasted media content using their respective media device.

13. The system of claim 11, wherein the user of the plurality of users interacts with the broadcasted media content by inserting a clip of media content into the broadcasted media content.

14. The system of claim 11, wherein the hardware processor is further configured to automatically cause, without user interaction, contributor metadata associated with the broadcasted media content to include the collaborator information.

15. The system of claim 11, wherein the hardware processor is further configured to receive an indication from the content creator to associate the collaborator information with the broadcasted media content.

16. The system of claim 11, wherein the hardware processor is further configured to insert the collaborator information into collaborator metadata associated with a portion of the broadcasted media content with which the user has interacted.

17. The system of claim 11, wherein the collaborator information includes a role of the user that has interacted with the broadcasted media content and wherein the hardware processor is further configured to determine revenue share information based at least in part on the interaction with the broadcasted media content and the role of the user.

18. The system of claim 17, wherein the collaborator information includes the editing tool used by the user to interact with the broadcasted media content and wherein the hardware processor is further configured to:
determine the role of the user based on the editing tool; and
determine the revenue sharing information based at least in part on the editing tool used by the user to interact with the broadcasted media content.

19. The system of claim 11, wherein the hardware processor is further configured to:
identify the user that has interacted with the broadcasted media content, wherein the interaction includes using a respective media device to provide user-generated media content;
determine a channel associated with the identified user; and
associate a link to the channel with the user-generated media content within the broadcasted media content.

20. The system of claim 11, wherein the hardware processor is further configured to transmit a message to the user verifying that the user interacted with the broadcasted media content, wherein the message includes the determined revenue sharing information and wherein the message is transmitted in response to determining that the user has provided user authentication information on a video providing service, the user is viewing the broadcasted media content on the video providing service, the user interacted with the broadcasted media content, and the user did not upload the broadcasted media content to the video providing service.

21. A non-transitory computer-readable medium containing computer executable instructions that, when executed by a processor, cause the processor to perform a method for determining collaborators associated with media content, the method comprising:
receiving a request from a content creator to initiate a session that broadcasts media content using a media device, wherein the request invites a plurality of users to participate in the session, and wherein the broadcasted media content is captured during the session using at least a media device of the content creator and a media device of at least one of the plurality of users;
determining that a user of the plurality of users has modified at least a portion of the broadcasted media content using an editing tool, wherein the user has been permitted to modify the broadcasted media content in response to determining that the user is one of the plurality of users invited in the received request and wherein user authentication information corresponding to the user has been received from the editing tool;
determining collaborator information associated with the modified portion of the broadcasted media content for the user based on the user authentication information received from the editing tool, wherein the collaborator information includes user information corresponding to the user authentication information and role information corresponding to a type of modification made using the editing tool;
in response to detecting that the broadcast media content is being uploaded to a video providing service, automatically causing, without user interaction, the determined collaborator information to be presented to the content creator in a recommendation interface for selecting one or more collaborators from the collaborator information to associate with the broadcasted media content prior to the broadcasted media content being shared on the video providing service; and
annotating the broadcast media content with collaborator metadata that includes the selected one or more collaborators from the recommendation interface, wherein the collaborator metadata is presented during playback of the broadcasted media content on the video providing service.

* * * * *